(12) United States Patent
Yoo et al.

(10) Patent No.: US 7,450,287 B2
(45) Date of Patent: Nov. 11, 2008

(54) OPTICAL SCANNING DEVICE AND METHOD FOR DETECTING SYNCHRONIZATION SIGNAL

(75) Inventors: Jae-hwan Yoo, Yongsin-si (KR); Hyeong-chae Kim, Yongsin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 57 days.

(21) Appl. No.: 11/103,644

(22) Filed: Apr. 12, 2005

(65) Prior Publication Data

US 2005/0243394 A1    Nov. 3, 2005

(30) Foreign Application Priority Data

Apr. 12, 2004    (KR)    .............. 10-2004-0024887

(51) Int. Cl.
*G02B 26/08* (2006.01)

(52) U.S. Cl. .............. 359/216; 359/204; 359/212; 347/261; 347/250

(58) Field of Classification Search ............. 359/216
See application file for complete search history.

(56) References Cited

U.S. PATENT DOCUMENTS

| | | | |
|---|---|---|---|
| 6,018,408 A | 1/2000 | Hong | ............... 359/201 |
| 6,317,244 B1 | 11/2001 | Ishibe | |
| 6,600,152 B2 * | 7/2003 | Paul | ............... 250/234 |
| 7,057,782 B2 * | 6/2006 | Kudo | ............... 359/216 |
| 2003/0025783 A1 * | 2/2003 | Mori | ............... 347/234 |
| 2003/0234968 A1 | 12/2003 | Kudo | |

FOREIGN PATENT DOCUMENTS

| | | |
|---|---|---|
| JP | 09-258124 | 10/1997 |
| JP | 2000-043324 | 2/2000 |
| JP | 2000-056245 | 2/2000 |
| JP | 2002-098921 | 4/2002 |
| JP | 2002-296531 | 10/2002 |
| JP | 2003-042897 | 2/2003 |
| JP | 2003-043388 | 2/2003 |
| JP | 2003-057148 | 2/2003 |
| KR | 1995-0029796 | 11/1995 |

* cited by examiner

*Primary Examiner*—Jessica T Stultz
(74) *Attorney, Agent, or Firm*—Roylance, Abrams, Berdo & Goodman, LLP

(57) ABSTRACT

Provided are an optical scanning device and a method for detecting a synchronization signal. In the optical scanning device, a beam incident on a scanning area of an object's surface to be scanned and a beam incident on a synchronization signal detector are emitted by a light source but deflected from different deflecting surfaces of a beam deflector.

14 Claims, 7 Drawing Sheets

OPTICAL SCANNING DEVICE AND METHOD FOR DETECTING SYNCHRONIZATION SIGNAL

CROSS-REFERENCE TO RELATED APPLICATION

This application claims the benefit under 35 U.S.C. §119 (a) of Korean Patent Application No. 10-2004-0024887, filed on Apr. 12, 2004, in the Korean Intellectual Property Office, the entire disclosure of which is hereby incorporated by reference.

BACKGROUND OF THE INVENTION

1. Field of the Invention

The present invention relates to a method for detecting a synchronization signal and an optical scanning apparatus that can provide stable detection of a synchronization signal.

2. Description of the Related Art

Optical scanning devices such as laser scanning units (LSUs) are typically used in an image recording apparatus, such as a copier, a printer, and a facsimile, that print an image on a sheet of printing paper, and create an electrostatic latent image by scanning a beam emitted by a light source, such as a semiconductor laser, onto a photoreceptor of an image forming apparatus.

Referring to FIG. 1, a conventional optical scanning device includes a collimating lens 3 that collimates a divergent laser beam emitted by a semiconductor laser 2 into a parallel or convergent beam, a cylindrical lens 5 that linearly focuses the beam that has passed through the collimating lens 3 onto the surface of a polygon mirror 7, the polygon mirror 7 deflects the beam, an f-θ lens 9 that is disposed between the polygon mirror 7 and an object's surface 1 to be scanned, and a mirror member 11 that reflects a laser beam for detecting a synchronization signal, a synchronization signal detecting lens 13 that collects the laser beam reflected by the mirror member 11, and a detector 15 that receives the laser beam for detecting a synchronization signal.

FIGS. 2A and 2B illustrate the rotation positions of the polygon mirror 7 when the laser beam is scanned onto the left and right sides of a scanning area within the object's surface 1 to be scanned, respectively. FIG. 3 illustrates positions on a reflecting surface of the polygon mirror 7 from which the laser beams for signal detection and scanning are reflected. When the polygon mirror 7 rotates clockwise, the laser beam is scanned from the left to the right of the object's surface 1 to be scanned. While a laser beam for detecting a synchronization signal is reflected from a start region 8a of each reflecting surface of the polygon mirror 7 in the conventional optical scanning device, a laser beam being scanned onto the object's surface 1 for producing an image is reflected from a scanning region 8b located adjacent to the start region 8a. Scanning regions 8c and 8d in FIG. 3 denote regions on a reflecting surface of the polygon mirror 7 from which the laser beams are reflected when scanned onto the left and right sides of an image area as shown in FIGS. 2A and 2B.

In this way, the conventional optical scanning device is constructed to reflect a beam for detecting a synchronization signal and then a beam for forming an image from each reflecting surface of the polygon mirror 7, thereby making stable detection of a synchronization signal difficult.

That is, as the rotation speed of the polygon mirror 7 has been recently increased due to the advancement of high speed, high resolution laser printers, contamination tends to occur on the surface of the polygon mirror 7 due to various factors. In particular, since a stagnant air flow 16 phenomenon occurs near the start region 8a of each reflecting surface when the polygon mirror 7 rotates as shown in FIG. 4, contamination in the start region 8a where synchronization is detected occurs faster than in the remaining regions. As the polygon mirror 7 rotates, air flows in the direction indicated by the straight arrows in FIG. 4.

Thus, the conventional optical scanning device may suffer from contamination on the surface of the polygon mirror 7, resulting in distortion or unstable detection of a synchronization signal.

SUMMARY OF THE INVENTION

Embodiments of the present invention provide an optical scanning device and a method for stably detecting a synchronization signal from an optical scanning device rotating at high speed.

According to an aspect of the present invention, there is provided an optical scanning device comprising a light source, a scanning unit comprising a beam deflector with a plurality of deflecting surfaces that deflects a beam emitted by the light source for scanning, a focusing optical system that focuses the beam deflected by the beam deflector onto a scanning area of an object's surface to be scanned, and a synchronization signal detecting portion that detects a synchronization signal using a portion of the beams deflected by the beam deflector. In the optical scanning device, a beam incident on the scanning area of the object's surface to be scanned and a beam incident on the synchronization signal detecting portion are emitted by the light source but deflected from different deflecting surfaces of the beam deflector.

Where a deflecting surface of the beam deflector from which a beam is deflected onto the scanning area of the object's surface to be scanned is an N-th deflecting surface, a beam for detection of a synchronization signal, which is incident on the synchronization signal detecting portion, may be deflected from an (N−1)th surface located before the N-th deflecting surface.

The synchronization signal detecting portion may be disposed to receive a beam for detection of a synchronization signal, the beam propagating between an edge of one scan line scanned onto the scanning area of the object's surface to be scanned through the N-th deflecting surface and a path of a beam emitted from the light source toward the scanning unit.

The synchronization signal detecting portion may comprise a synchronization signal detecting lens that converges the beam for detection of a synchronization signal, which is deflected from the (N−1)th deflecting surface and a synchronization signal detector that receives the beam converged by the synchronization signal detecting lens.

While a beam deflected from an edge of a deflecting surface of the beam deflector may be used to detect a synchronization signal used as a reference for scanning a beam through a deflecting surface located next to the deflecting surface, most of the remaining area on the same deflecting surface may be used for scanning the beam onto the scanning area of the object's surface to be scanned.

The beam deflector may comprise a polygon mirror with a plurality of mirror surfaces. The optical scanning device may further comprise a collimating lens that is disposed between the light source and the scanning unit and collimates a divergent beam emitted by the light source into a parallel or convergent beam. The optical scanning device may also comprise a cylindrical lens that linearly focuses the beam that has passed through the collimating lens onto a deflecting surface of the beam deflector.

According to another aspect of the present invention, there is provided a method for detecting a synchronization signal in an optical scanning device comprising a light source, a scanning unit comprising a beam deflector with a plurality of deflecting surfaces that deflects a beam emitted by the light source for scanning, a focusing optical system that focuses the beam deflected by the beam deflector onto a scanning area of an object's surface to be scanned, and a synchronization signal detecting portion that detects a synchronization signal using a portion of the beams deflected by the beam deflector. The method comprises the steps of allowing a beam deflected from a preceding (N−1)th deflecting surface to be incident onto the synchronization signal detecting portion where a deflecting surface of the beam deflector from which a beam is deflected onto the scanning area of the object's surface to be scanned is an N-th deflecting surface; and receiving the beam being incident onto the synchronization signal detecting portion and detecting a synchronization signal used as a reference for scanning a beam through the N-th deflecting surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 5:
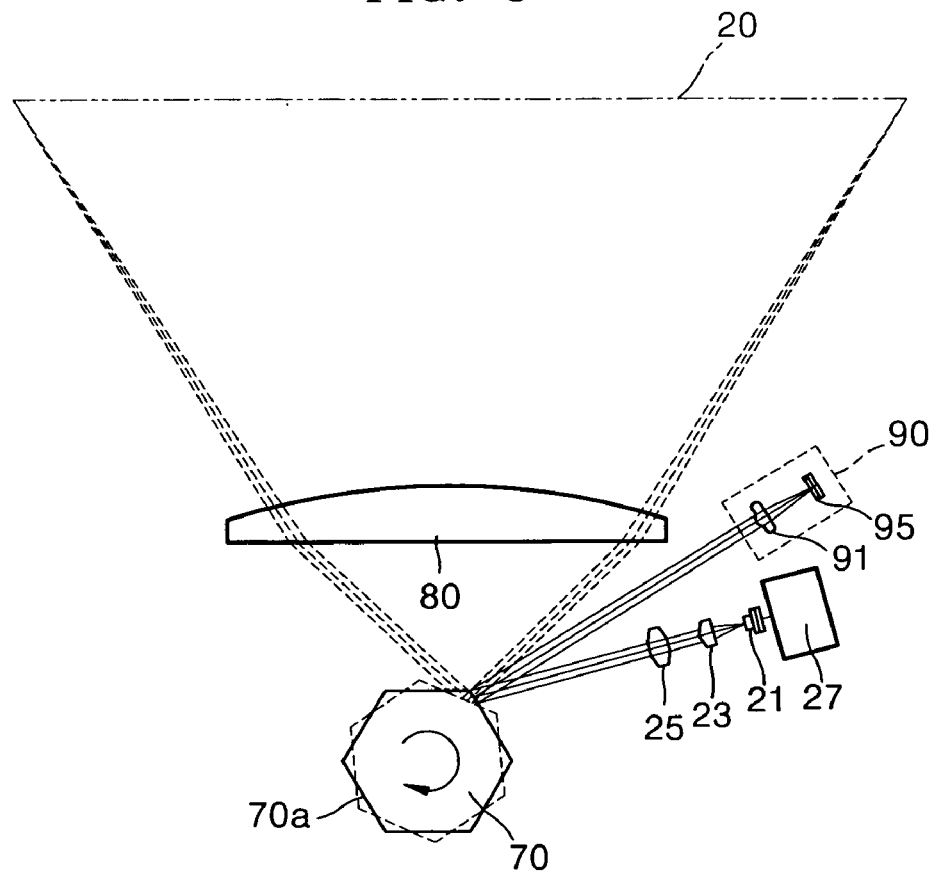
FIG. 5 is a schematic diagram of an optical scanning device according to an embodiment of the present invention.

Referring to FIG. 5, an optical scanning device according to an embodiment of the present invention comprises a light source 21 that emits a beam according to an image signal, a scanning unit including a beam deflector 70 with a plurality of deflecting surfaces 70a and which deflects the beam emitted by the light source 21, a focusing optical system that focuses the beam deflected by the beam deflector 70 onto an object's surface 20 to be scanned, for example, a photoreceptor surface of an image forming apparatus, and a synchronization signal detecting portion 90 that detects a synchronization signal required to achieve horizontal synchronization using a portion of the beams deflected by the beam deflector 70. The optical scanning device is constructed such that a beam incident on a scanning area of the object's surface 20 to be scanned and a beam incident on the synchronization signal detecting portion 90 are emitted by the light source 21 and deflected from different deflecting surfaces of the beam deflector 70.

The optical scanning device may further comprise a collimating lens 23 that collimates a divergent laser beam emitted by the light source 21 into a parallel or convergent beam, and a cylindrical lens 25 that linearly focuses the beam that has passed through the collimating lens 23 onto the deflecting surface 70a of the beam deflector 70. In FIG. 5, reference numeral 27 denotes a light source controller that controls the on and off state of the light source 21.

The light source 21 can be constructed of a single light source with one or a plurality of light-radiating points or a plurality of light sources. The light source 21 can be a semiconductor laser that emits a laser beam. The scanning unit allows a beam to be scanned in a horizontal, that is, main scanning direction at a constant linear velocity (CLV) and comprises the beam deflector 70 and a driving source (not shown) such as a motor that rotatably drives the beam deflector 70. The beam deflector 70 with a plurality of deflecting surfaces 70a is rotatably driven by the driving source at CLV in one direction only during an image-forming operation. The beam deflector 70 may be a polygon mirror with a plurality of mirror surfaces (deflecting surfaces 70a) that deflects and reflects the incident beam as shown in FIG. 5. The beam deflector 70 scans a beam reflected from each deflecting surface 70a horizontally, which is in a main scanning direction, at a CLV.

The focusing optical system is comprised of at least one optical element comprising a focusing lens 80, such as an f-θ lens, and corrects an aberration experienced by the beam deflected from each deflecting surface 70a of the beam deflector 70 and scanned at CLV and focuses the resulting beam onto the object's surface 20 to be scanned onto a photoreceptor surface on which an image will be created. While FIG. 5 shows the focusing optical system comprising one focusing lens 80, the focusing optical system may have various other constructions.

The focusing lens 80 is disposed between the beam deflector 70 and the midpoint between the beam deflector 70 and the object's surface 20 to be scanned. The focusing lens 80 focuses the beam deflected from each deflecting surface 70a of the beam deflector 70 at different refractive powers in the main scanning and the subscanning directions. The cylindrical lens 25 with different refractive powers for the main scanning direction and the subscanning direction linearly focuses a beam onto the deflecting surface 70a of the beam deflector 70.

The synchronization signal detecting portion 90 comprises a synchronization signal detecting lens 91 that converges a beam for detecting a synchronization signal that has been deflected (or reflected) by the beam deflector 70 and a synchronization signal detector 95 that receives the laser beam converged by the synchronization signal detecting lens 91. The synchronization signal detecting lens 91 focuses the incident beam onto the synchronization signal detector 95 that receives the incident beam and detects a synchronization signal required to achieve horizontal synchronization.

Figure 6:
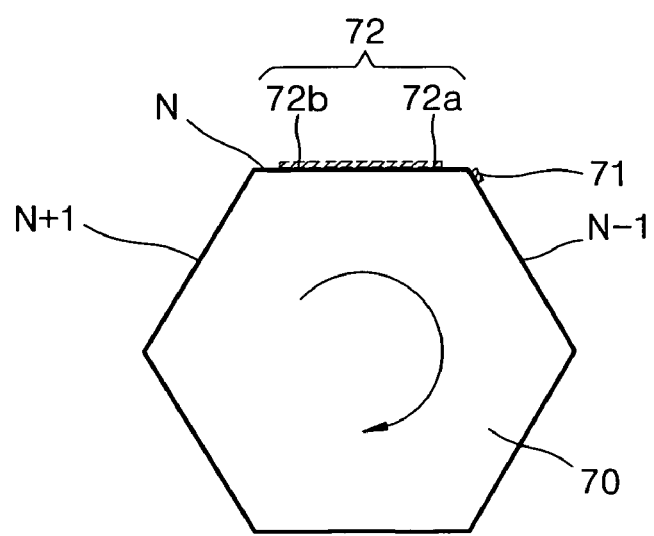
FIG. 6 illustrates regions on a deflecting surface of the beam deflector shown in FIG. 5 from which beams for synchronization signal detection and scanning are deflected.
Figure 7A:
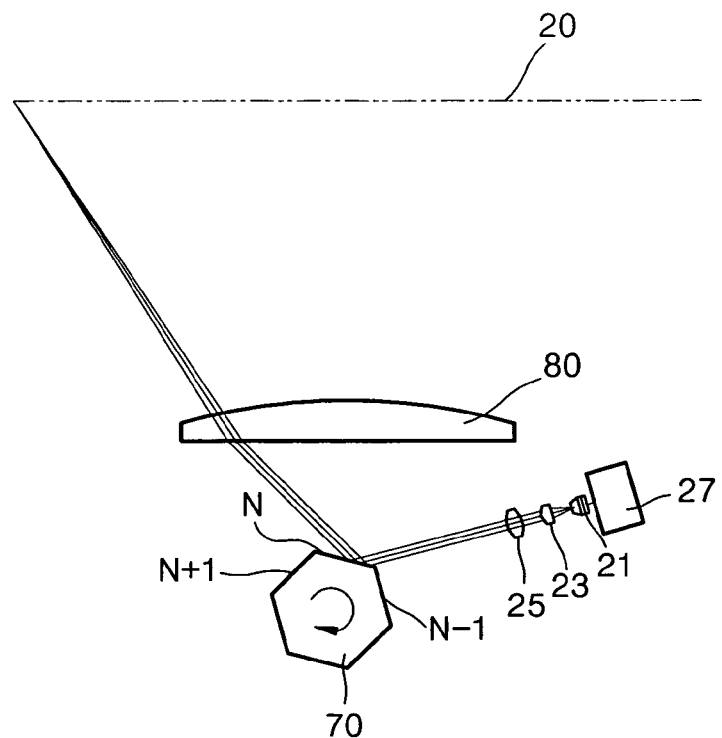
FIGS. 7A and 7B illustrate the rotation positions of the beam deflector shown in FIG. 5 when a laser beam is scanned onto the left and right sides of a scanning area within an object's surface to be scanned.
Figure 7B:
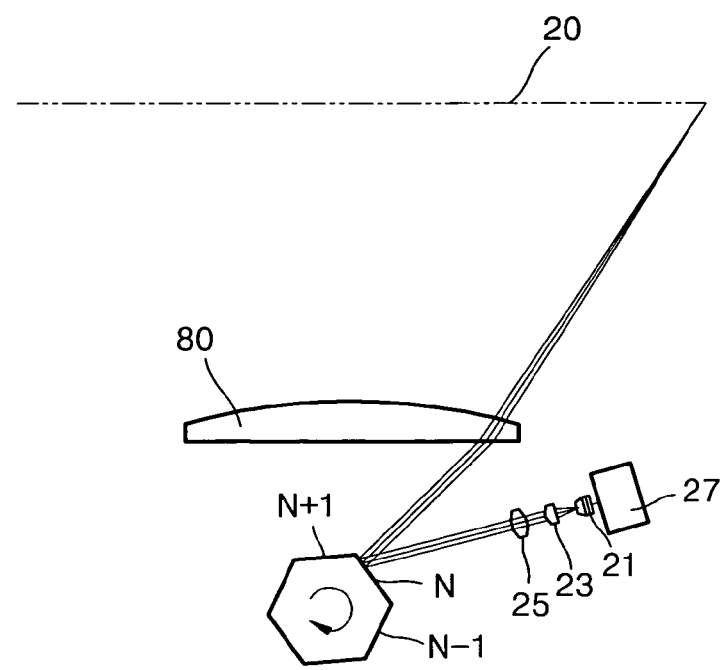

FIG. 6 illustrates regions on the deflecting surface 70a of the beam deflector 70 from which beams for synchronization signal detection and scanning are deflected. FIGS. 7A and 7B illustrate the rotation positions of the beam deflector 70 when a laser beam is scanned onto the left and right sides of a scanning area of the object's surface 20 to be scanned. FIGS. 5 through 7B show examples in which the beam deflector 70 rotates clockwise.

When a beam is deflected from an N-th deflecting surface of the beam deflector 70 onto the scanning area on the object's surface 20 to be scanned, a beam for detecting a synchronization signal that is incident onto the synchronization signal detecting portion 90 is deflected from an edge 71 on an (N−1)th deflecting surface existing before the N-th deflecting surface.

A beam deflected from the edge 71 of the (N−1)th deflecting surface propagates between an edge of a scan line scanned onto the scanning area of the object's surface 20 to be scanned through the N-th deflecting surface and a path of a beam that is emitted by the light source 21 into the scanning unit. The synchronization signal detecting portion 90 may be disposed to receive the propagating beam.

That is, the synchronization signal detecting portion 90 is disposed to receive a beam, which is reflected from the edge 71 of the (N−1)th deflecting surface used for creating the previous scan line and propagates between an edge of a scan line to be newly created, which is a right edge when the beam deflector 70 rotates clockwise, and a path of a beam emitted by the light source 21 toward the beam deflector 70, for detection of a synchronization signal.

In this way, the optical scanning device employs a beam reflected from the edge 71 of the (N−1)th deflecting surface used for creating the previous scan line in order to detect a synchronization signal for newly scanning a beam through the N-th deflecting surface. Most of the areas on each deflecting surface 70a of the beam deflector 70 are used in scanning a beam onto a scanning area on the object's surface 20 to be scanned, and a beam deflected from an edge of the deflecting surface 70a is used to detect a synchronization signal used as a reference for scanning a beam through the next deflecting surface.

Thus, for example, while a beam for detecting a synchronization signal is reflected from the edge 71 of the (N−1)th deflecting surface used to form the previous scan line, a beam scanned according to the detected synchronization signal is reflected from an area 72 of the N-th deflecting surface.

A synchronization signal used as a reference for scanning a beam through the N-th deflecting surface is detected while the synchronization signal detecting portion 90 is receiving a beam deflected from the (N−1)th deflecting surface. Similarly, a synchronization signal for scanning a beam through an N+1-th deflecting surface is detected while receiving a beam reflected from an edge of the N-th deflecting surface.

As described above, the synchronization signal detecting portion 90 is disposed to receive a beam traveling between an edge of one scan line and a path of a beam emitted from the light source 21 toward the scanning unit, thereby eliminating the need for the mirror member (11 of FIG. 1) for detecting a synchronization signal, as opposed to a conventional optical scanning device.

Reference numerals 72a and 72b in FIG. 6 denote areas on the N-th deflecting surface of the beam deflector 70 from which beams are reflected when scanned onto the left and right sides of the object's surface 20 to be scanned, respectively.

The operation of the optical scanning device will now be described. When the beam deflector 70 rotates clockwise, a synchronization signal is detected by a beam deflected, for example, reflected from one deflecting surface of the rotating beam deflector 70. Then, the beam deflector 70 continues to rotate so that a beam is scanned through a deflecting surface located next to the deflecting surface from which the beam has been reflected for detection of the synchronization signal. A beam is reflected from the right side of the deflecting surface of the beam deflector 70 and focused onto the left side of the scanning area of the object's surface to be scanned. As the beam deflector 70 continues to rotate, a beam is reflected from the beam deflector 70 and scanned onto the scanning area from the left to right side of the object surface being scanned. Lastly, a beam reflected from the left side of the same deflecting surface is focused onto the right side of the object's surface 20 to be scanned.

The beam for detecting a synchronization signal is reflected from the edge 71 of the deflecting surface through the above process, and a beam scanned onto the scanning area of the object's surface 20 to be scanned is reflected from most of the remaining area on the same deflecting surface.

Figure 8:
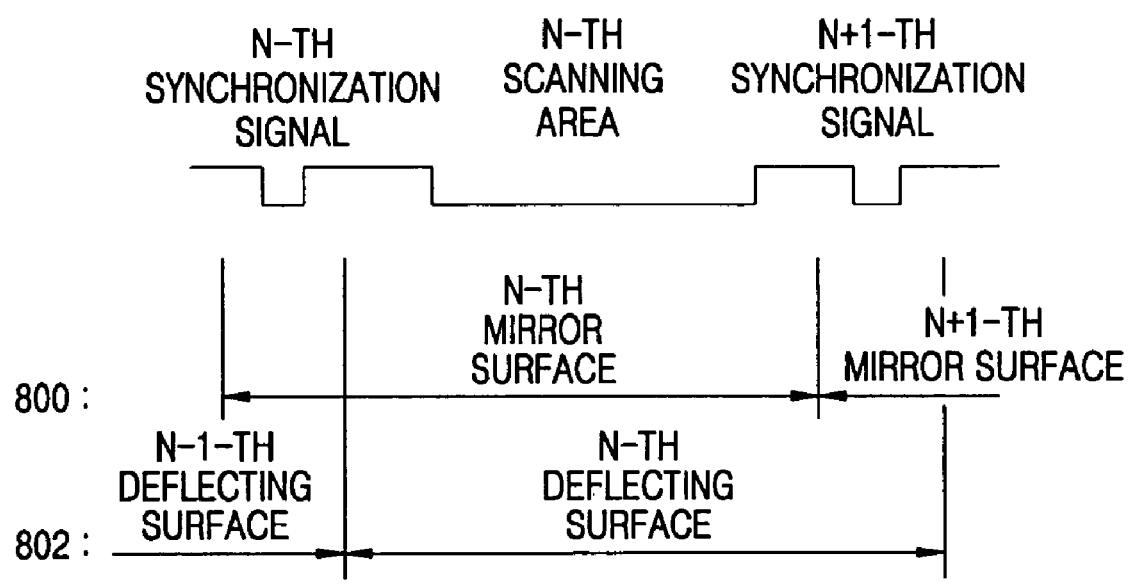
FIG. 8 illustrates a comparison between a synchronization signal detection method according to the present invention and the conventional method.

FIG. 8 illustrates comparison between embodiments of scanning signal detection of the present invention 802 and a conventional detection 800. Referring to FIG. 8, a scanning signal contains N-th and (N+1)th synchronization signals coming before and after an N-th image signal, respectively, corresponding to an N-th scanning area. Here, the N-th image signal refers to a signal for scanning a beam onto a scanning area of the object's surface 20 to be scanned through the N-th deflecting surface.

Figure 1:
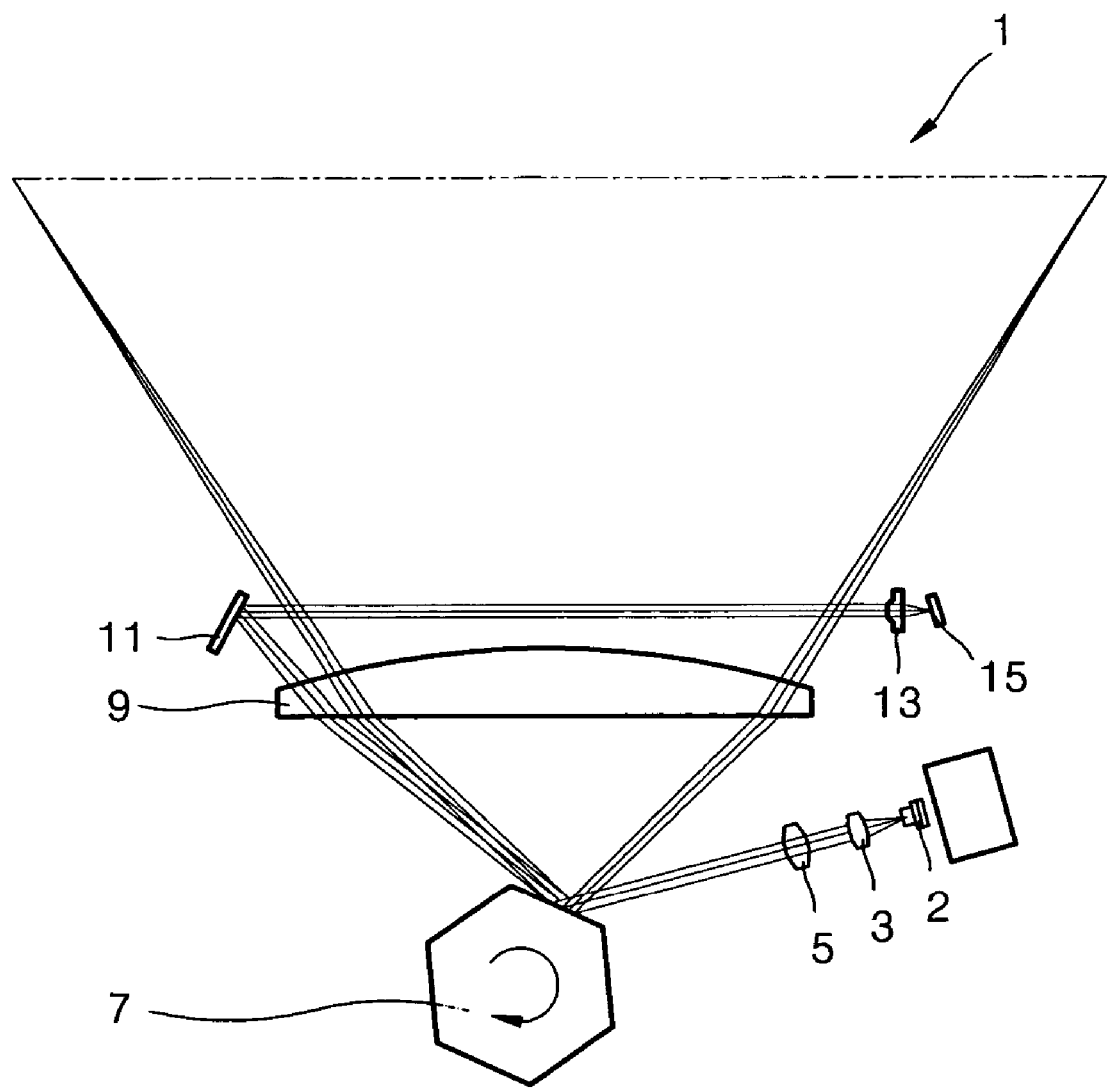
FIG. 1 is a schematic diagram of a conventional optical scanning device.
Figure 2A:
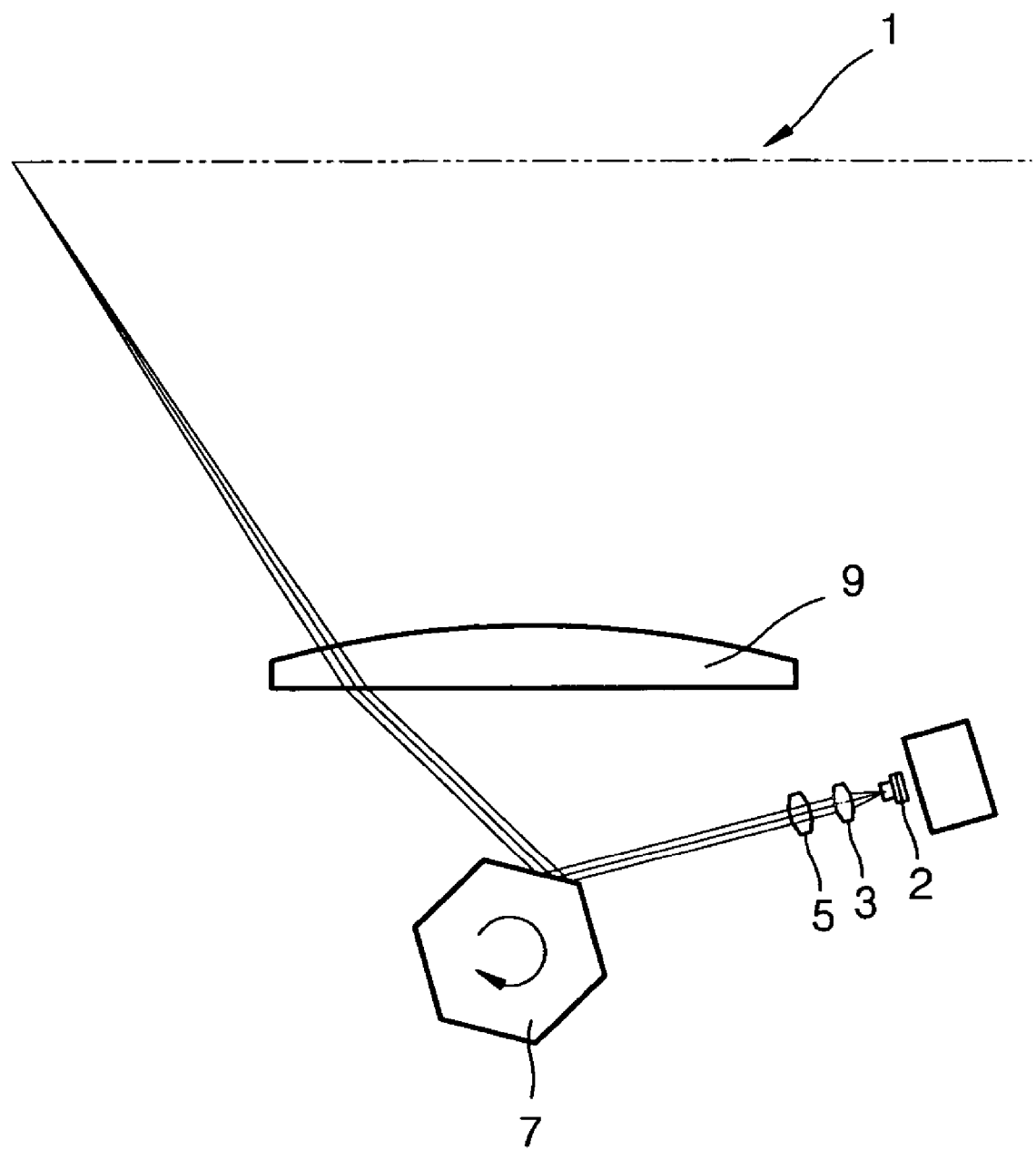
FIGS. 2A and 2B illustrate the rotation positions of the polygon mirror shown in FIG. 1 when a laser beam is scanned onto the left and right sides of a scanning area within an object's surface to be scanned, respectively.
Figure 2B:
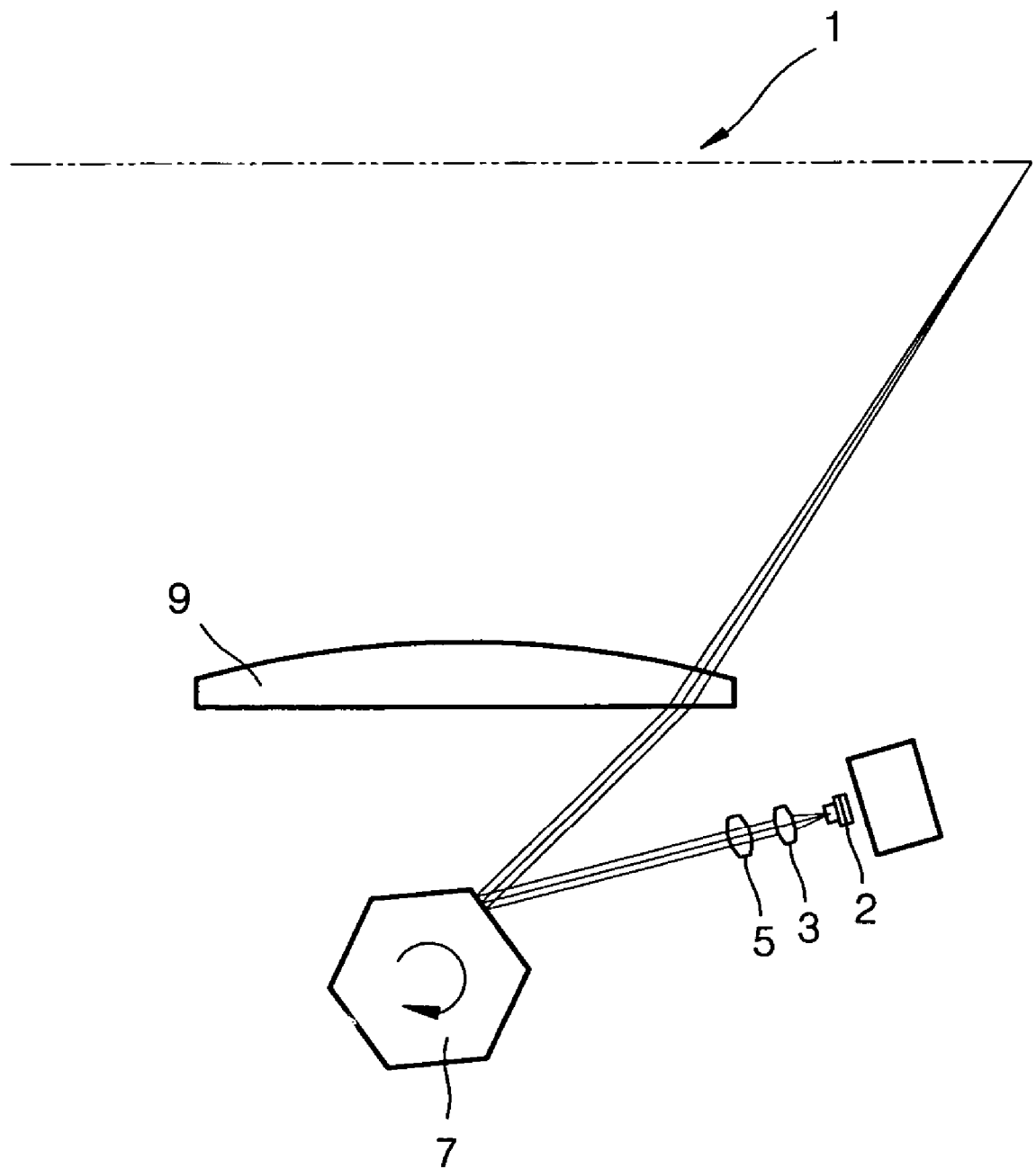
Figure 3:
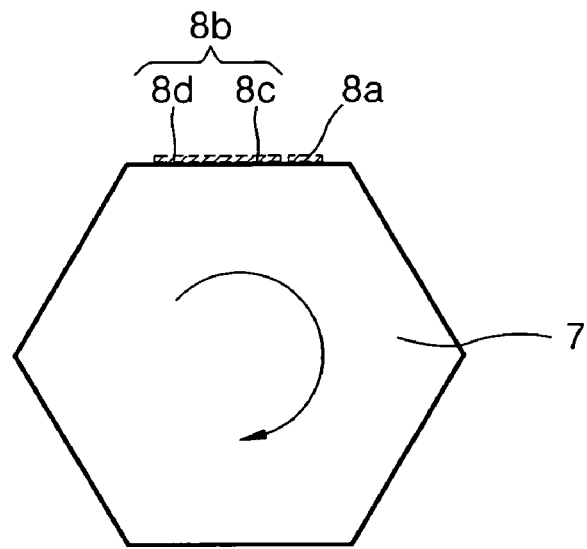
FIG. 3 illustrates regions on a reflecting surface of the polygon mirror shown in FIG. 1, from which beams for synchronization signal detection and scanning are reflected.
Figure 4:
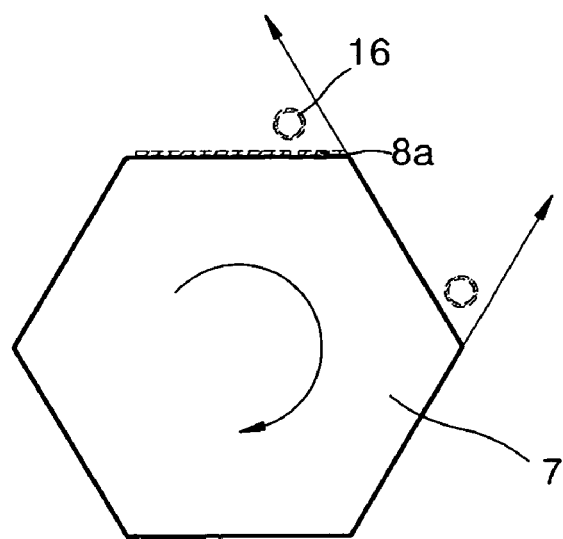
FIG. 4 illustrates a stagnant air flow phenomenon near a start region of each reflecting surface when the polygon mirror shown in FIG. 1 rotates.

According to the conventional approach 800, beams corresponding to N-th synchronization signal and N-th image signal are sequentially reflected from the start region 8a and the scanning region 8b (shown in FIG. 3) of an N-th mirror surface of the polygon mirror (7 of FIG. 1). Conventionally, the beam for synchronization signal detection and the beam for creating a scan line according to the detected synchronization signal are reflected from the same mirror surface of the polygon mirror 7.

Conversely, according to embodiments of the present invention 802, a beam corresponding to the N-th synchronization signal is reflected from the edge 71 of the (N−1)th deflecting surface of the beam deflector 70 while a beam corresponding to the N-th image signal for creating a scan line according to the N-th synchronization signal is reflected from the area 72 on the N-th deflecting surface located next to the (N−1)th deflecting surface.

That is, beams reflected from different deflecting surfaces of the beam deflector 70 are used to detect a synchronization signal and create a scan line with the detected synchronization signal, respectively. For example, a synchronization signal may be detected on the N-th deflecting surface of the beam deflector 70 and used as a reference to control the on and off state of the beam according to the N-th image signal and focus the beam reflected from the N-th deflecting surface onto the scanning area of the object's surface 20 to be scanned.

In contrast to the conventional method, embodiments of the present invention allow a synchronization signal for scanning a beam through the next deflecting surface to be detected at an edge of each deflecting surface suffering no stagnant phenomenon in an air flow while the beam deflector rotates, thereby preventing distortion of a synchronization signal due to contamination on the surface of the beam deflector while enabling stable detection thereof.

While FIGS. 5 through 7B show examples in which the beam deflector 70 rotates clockwise, it can also rotate counter-clockwise. When the beam deflector 70 rotates counter-clockwise, optical elements comprising the light source 21 and the synchronization signal detecting portion 90 are disposed in the opposite direction to that shown in FIG. 5.

Thus, the synchronization signal detection method and the optical scanning device according to embodiments of the present invention prevent distortion of a synchronization signal due to contamination on a beam deflector surface, thereby allowing stable signal detection even when the optical scanning device rotates at high speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical scanning device comprising:
   a light source;
   a scanning unit comprising a beam deflector with a plurality of deflecting surfaces for deflecting a beam emitted by the light source for scanning;
   a focusing optical system for focusing the beam deflected by the beam deflector onto a scanning area of an object's surface to be scanned; and
   a synchronization signal detecting portion for detecting a synchronization signal using a portion of the beams deflected by the beam deflector, wherein a beam incident on the scanning area of the object's surface to be scanned are emitted by the same light source and deflected from different deflecting surfaces of the beam deflector.

2. The optical scanning device of claim 1, wherein a deflecting surface of the beam deflector from which a beam is deflected onto the scanning area of the object's surface to be scanned is an N-th deflecting surface, wherein further a beam for detection of a synchronization signal, which is incident onto the synchronization signal detecting portion, is deflected from an (N−1)th surface located before the N-th deflecting surface.

3. The optical scanning device of claim 2, wherein the synchronization signal detecting portion is disposed for receiving a beam for detection of a synchronization signal, the beam propagates between an edge of one scan line scanned onto the scanning area of the object's surface to be scanned through the N-th deflecting surface and a path of a beam emitted from the light source toward the scanning unit.

4. The optical scanning device of claim 3, wherein the synchronization signal detecting portion comprises:
   a synchronization signal detecting lens for converging the beam for detection of a synchronization signal, which is deflected from the (N−1)th deflecting surface; and
   a synchronization signal detector for receiving the beam converged by the synchronization signal detecting lens.

5. The optical scanning device of claim 3, wherein a beam deflected from an edge of a deflecting surface of the beam deflector is used to detect a synchronization signal used as a reference for scanning a beam through a different deflecting surface located next to the deflecting surface, and most of the remaining area on the different deflecting surface is used for scanning the beam onto the scanning area of the object's surface to be scanned.

6. The optical scanning device of claim 2, wherein the synchronization signal detecting portion comprises:
   a synchronization signal detecting lens for converging the beam for detection of a synchronization signal, which is deflected from the (N−1)th deflecting surface; and
   a synchronization signal detector for receiving the beam converged by the synchronization signal detecting lens.

7. The optical scanning device of claim 2, wherein a beam deflected from an edge of the (N−1)th deflecting surface of the beam deflector is used to detect a synchronization signal used as a reference for scanning a beam through a different deflecting surface located next to the deflecting surface, and most of the remaining area on the different deflecting surface is used for scanning the beam onto the scanning area of the object's surface to be scanned.

8. The optical scanning device of claim 1, wherein the beam deflector comprises a polygon mirror with a plurality of mirror surfaces.

9. The optical scanning device of claim 1, further comprising a collimating lens disposed between the light source and the scanning unit and for collimating a divergent beam emitted by the light source into at least one of a parallel and convergent beam.

10. The optical scanning device of claim 9, further comprising a cylindrical lens for linearly focusing the beam that has passed through the collimating lens onto a deflecting surface of the beam deflector.

11. A method for detecting a synchronization signal in an optical scanning device including a light source, a scanning unit comprising a beam deflector with a plurality of deflecting surfaces that deflects a beam emitted by the light source for scanning, a focusing optical system that focuses the beam deflected by the beam deflector onto a scanning area of an object's surface to be scanned, and a synchronization signal detecting portion that detects a synchronization signal using some of beams deflected by the beam deflector, the method comprising the steps of:
   deflecting a beam from an edge of a preceding (N−1)th deflecting surface to be incident onto the synchronization signal detecting portion where a different deflecting surface of the beam deflector from which a beam is deflected onto the scanning area of the object's surface to be scanned is an N-th deflecting surface; and
   receiving the beam incident onto the synchronization signal detecting portion and detecting a synchronization signal used as a reference for scanning a beam through the N-th deflecting surfaces,
   wherein a beam incident on the scanning area of the object's surface to be scanned and a beam incident on the synchronization signal detecting portion are emitted by the same light source.

12. The method of claim 11, wherein the beam incident onto the synchronization signal detecting portion is a beam propagating between an edge of one scan line scanned onto the scanning area of the object's surface to be scanned through the N-th deflecting surface and a path of a beam emitted from the light source toward the scanning unit.

13. The method of claim 12, wherein a beam deflected from an edge of the (N−)th deflecting surface of the beam deflector is used to detect a synchronization signal used as a reference for scanning a beam through the N-th deflecting surface located next to the (N−1)th deflecting surface, and most of the remaining area on the N-th deflecting surface is used for scanning the beam onto the scanning area of the object's surface to be scanned.

14. The method of claim 11, wherein a beam deflected from an edge of the (N−1)th deflecting surface of the beam deflector is used to detect a synchronization signal used as a reference for scanning a beam through the N-th deflecting surface located next to the (N−1)th deflecting surface, and most of the remaining area on the N-th deflecting surface is used for scanning the beam onto the scanning area of the object's surface to be scanned.

* * * * *